United States Patent [19]

Lee et al.

[11] 4,410,659

[45] Oct. 18, 1983

[54] MANUFACTURE OF RUBBER MODIFIED COPOLYMERS IN AN EXTRUDER TYPE REACTOR

[75] Inventors: Robert W. Lee, Houston, Tex.; William J. Miloscia, Shaker Heights, Ohio

[73] Assignee: The Standard Oil Company, Cleveland, Ohio

[21] Appl. No.: 309,718

[22] Filed: Oct. 8, 1981

Related U.S. Application Data

[63] Continuation-in-part of Ser. No. 92,260, Nov. 7, 1979, abandoned.

[51] Int. Cl.$^3$ .................... C08F 279/02; C08F 279/04
[52] U.S. Cl. ..................................... 525/53; 525/276; 525/295; 525/300; 525/302; 525/310; 525/312; 525/315; 525/316; 525/329.3
[58] Field of Search .......................................... 525/53

[56] References Cited

U.S. PATENT DOCUMENTS

| | | | |
|---|---|---|---|
| 3,178,489 | 4/1965 | Lunk et al. | 525/53 |
| 3,511,895 | 5/1970 | Kydonieus et al. | 260/876 |
| 3,536,680 | 10/1970 | Illing | 526/88 |
| 3,780,139 | 12/1973 | Sutter et al. | 525/314 |
| 3,799,234 | 3/1974 | Skidmore | 159/2 E |
| 3,928,495 | 12/1975 | Dalton | 260/876 R |
| 3,931,356 | 1/1976 | Dalton | 260/876 R |
| 4,308,354 | 12/1981 | Jung et al. | 525/84 |

Primary Examiner—Stanford M. Levin
Attorney, Agent, or Firm—Gary R. Plotecher; Herbert D. Knudsen; Larry W. Evans

[57] ABSTRACT

A process for the impact modification of a plastic with a rubbery polymer to form a thermoplastic resin in a reactor extruder is provided. The process includes the steps of dissolving a rubbery polymer in at least one ethylenically unsaturated monomer to form a feed solution, introducing the feed solution into the feed section of a twin screw reactor extruder, heating the feed solution under pressure to a temperature sufficient for polymerization to begin, shearing the feed solution until the solids content formed is equal to at least about twice the rubber content in the feed solution so as to produce a phase inversion product wherein discrete particles of rubber become encapsulated in a continuous phase of plastic polymer formed from the ethylenically unsaturated monomer, thereafter reacting the phase inversion product until at least about 70 weight percent of the feed solution has been converted to a thermoplastic resin, and extruding the said thermoplastic resin through a die. A novel thermoplastic resin is also provided having a uniform distribution of rubber particles dispersed within the plastic phase of the resin, the rubber particles ranging in size of from about 0.01 to 0.50 microns. The process is particularly useful for the preparation of high nitrile and ABS type resins.

27 Claims, 6 Drawing Figures

1μm

MANUFACTURE OF RUBBER MODIFIED COPOLYMERS IN AN EXTRUDER TYPE REACTOR

CROSS REFERENCE TO RELATED APPLICATIONS

This application is a continuation-in-part of U.S. Ser. No. 92,260, filed Nov. 7, 1979, now abandoned.

TECHNICAL FIELD

The present invention provides a process for the manufacture of acrylonitrile-butadiene-styrene (ABS) type copolymers and high nitrile copolymers in a reactor extruder. The process disclosed provides two useful resins, a polybutadiene modified poly(styrene-co-acrylonitrile) resin (ABS) and a rubber modified acrylonitrile-methylacrylate, or high nitrile, copolymer. Resins of the first type ABS, are commercially prepared via emulsion polymerization techniques. The high nitrile copolymer resins can be prepared via any of the generally known polymerization techniques. The reactor extruder resins of the present invention are chemically similar but possess better rubber dispersion, increased melt flow and lower process torque at equivalent rubber levels and are, therefore, also deemed to be novel. ABS resins are useful in injection and compression molding applications where high impact thermoplastics are desired. The high nitrile resins disclosed herein have particular utility as food packaging in both sheet and film forms.

BACKGROUND ART

The modification of polystyrene with butadiene-styrene copolymer via bulk polymerization is taught by U.S. Pat. No. 3,178,489. Such polymerizations are conducted by dissolving the rubber in a mixture of the monomers to be polymerized and the patent discloses that the polymerization can be conducted in various known bulk polymerization equipment including kettles, columns or towers, extruders or any other equipment where a viscous polymerization mass can be maintained at controlled elevated temperatures. Polymerizations are conducted in two stages, a first stage in a kettle carried out between 90° to 120° C. and a second stage in a tower between 130° and 200° C. There is no clear teaching of the manner in which an extruder can be employed.

U.S. Pat. No. 3,536,680 provides a method for polymerizing ethylenically unsaturated monomers in an extruder, although there is no disclosure of rubber modification. Polymerization is conducted within the extruder between 30 seconds to 30 minutes and temperatures disclosed range from 100° to 400° C. resulting from kneading and shearing action. Although the use of the twin screw extruder disclosed in the patent is relevant, the temperatures are too high for the formation of rubber-modified plastic resins and, the time is longer than is desirable.

A U.S. patent which provides for the continuous production of copolymers from 1,3-dienes and monovinyl aromatics is No. 3,780,139. The temperature within the extruder is lower than the aforementioned patent viz., 50° to 150° C. and residence time ranges from about 10 to 30 minutes. Nevertheless, the patent does not disclose the formation of resin copolymers of monomers such as styrene, acrylonitrile and methacrylate grafted onto a preformed elastomer.

Therefore, the prior art of which we are aware has not disclosed a satisfactory process for the preparation of high impact strength rubber-modified thermoplastic resins of the ABS or high nitrile type which resins have improved processing properties over comparable resins produced via emulsion polymerization.

DISCLOSURE OF THE INVENTION

It is therefore an object of the present invention to provide a process for the preparation of ABS and high nitrile type resins in a reactor extruder, which resins have improved impact strength over existing resins.

It is another object of the present invention to provide a process for the preparation of ABS and high nitrile type resins in a reactor extruder, which resins have improved processing properties over existing resins.

It is yet another object of the present invention to provide a process for the preparation of ABS and high nitrile type resins in a reactor extruder, which resins have a smaller rubber particle and more uniform distribution thereof throughout the thermoplastic resin than resins of comparable composition produced via other techniques.

It is still another object of the present invention to provide a process as set forth hereinabove wherein a rubbery polymer is dissolved in one or more plastic-forming monomers which solution is then polymerized within a reactor extruder.

It is yet another object of the present invention to provide rubber-modified thermoplastic resins of the ABS and high nitrile type having a uniform, small particle size of rubber uniformly dispersed within the plastic phase of the resin.

These and other objects, together with the advantages thereof over the prior art, which shall become apparent from the specification which follows, are accomplished by our invention as hereinafter described and claimed.

In general, the process of the present invention includes the steps of dissolving a rubbery polymer in at least one ethylenically unsaturated monomer to form a feed solution, introducing the feed solution into the feed section of a twin screw reactor extruder, heating the feed solution under pressure to a temperature sufficient for polymerization to begin and shearing the feed solution until the solids content formed is equal to at least about twice the rubber content in the feed solution so as to produce a phase inversion product wherein discrete particles of rubber become encapsulated in a continuous phase of plastic polymer, the latter being formed from the ethylenically unsaturated monomer or monomers. The process is concluded by thereafter reacting the phase inversion product until at least about 70 weight percent of the feed solution has been converted to a thermoplastic resin and then extruding the thermoplastic resin through a die. The process allows the preparation of high nitrile resins such as comprise acrylonitrile and methylacrylate modified by butadiene/acrylonitrile rubber polymer and acrylonitrile/styrene/butadiene, or ABS, resins.

The thermoplastic resins formed according to the process of the present invention are also deemed to be novel and are characterized by having a uniform, small particle size of rubber uniformly dispersed within the plastic phase of the resin. Particle size is on the order of from about 0.01 to 0.50 microns.

PREFERRED MODE FOR CARRYING OUT THE INVENTION

Figure 1:
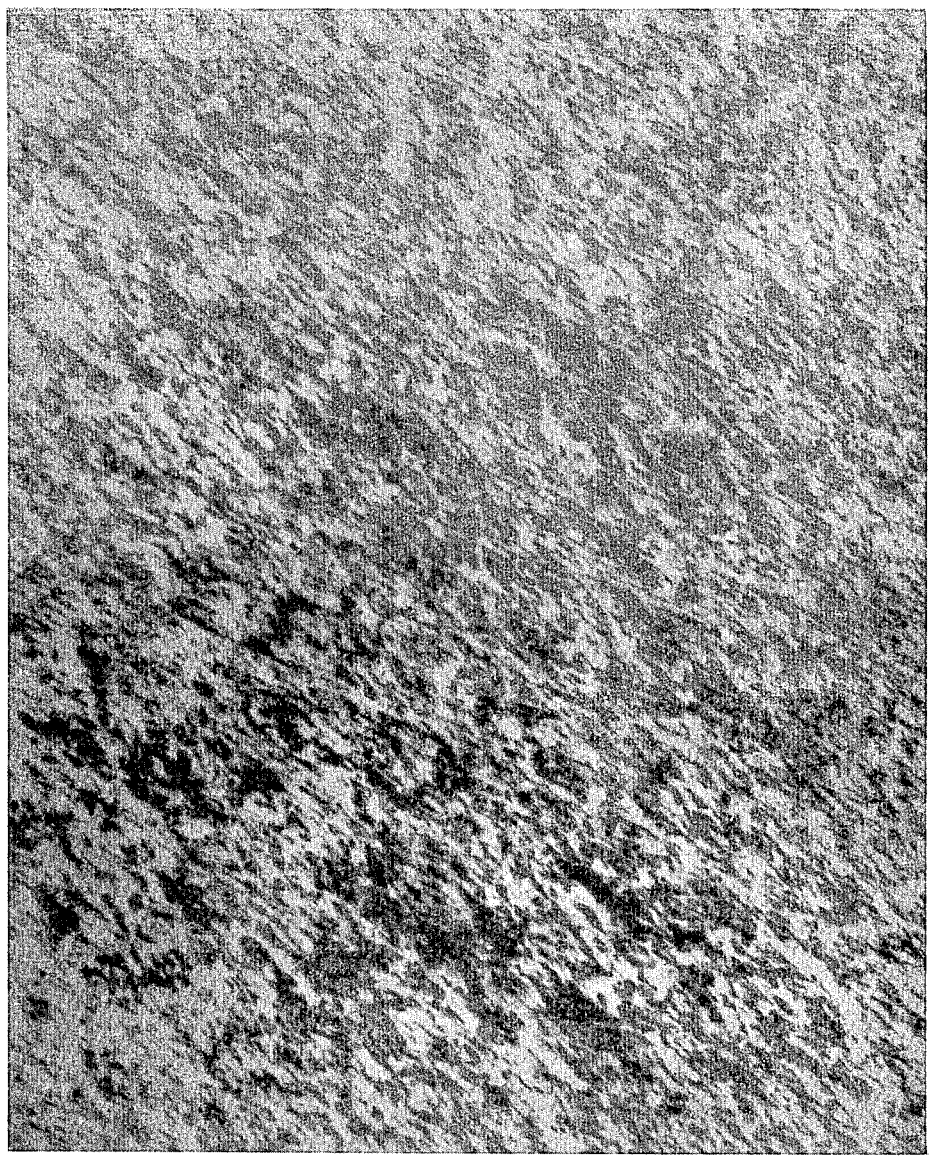
FIG. 1 is a transmission electron photomicrograph of an ABS resin produced according to the process of the present invention.

Polymers prepared according to the process of the present invention are polymerized within a twin screw extruder as will be discussed hereinbelow. The polymer product or resin is prepared by polymerizing a feed solution which comprises a rubber polymer dissolved in one or more monomers which form plastics.

The high nitrile copolymers that can be prepared according to the process of the invention are those produced by polymerizing a major proportion of a monounsaturated or olefinically unsaturated nitrile, e.g., acrylonitrile, and a minor proportion of another monovinyl monomer component copolymerizable therewith such as styrene, in the presence of a rubbery polymer such as a diene rubber which can be a homopolymer or copolymer of a conjugated diene monomer.

Regarding the plastic-forming monomers, the olefinically unsaturated nitriles used in the present invention are the alpha, beta-olefinically unsaturated mononitriles having the structure:

$$CH_2=C-CN$$
$$|$$
$$R$$

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, monovinyl aromatic monomers, and others.

The esters of olefinically unsaturated carboxylic acids include those having the structure:

$$CH_2=C-COOR_2$$
$$|$$
$$R_1$$

wherein $R_1$ is hydrogen, an alkyl group having from 1 to 30 carbon atoms, or a halogen, and $R_2$ is an alkyl group having from 1 to 6 carbon atoms. Compounds of this type include methyl acrylate, ethyl acrylate, the propyl acrylates, the butyl acrylates, the amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like with methyl acrylate, ethyl acrylate, methyl methacrylate and ethyl methacrylate being preferred.

The alpha-olefins useful in the present invention are those having at least 4 and as many as 10 carbon atoms having the structure:

$$CH_2=C$$
$$/ \ $$
$$R_3 \quad R_4$$

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethylbutene-1, 2-propyl pentene-1, and the like with isobutylene being preferred.

The vinyl ethers include methyl vinyl ether, ethyl vinyl ether, propyl vinyl ethers, and butyl vinyl ethers, methyl isopropenyl ether, ethyl isopropenyl ether and the like with methyl vinyl ether, ethyl vinyl ether, and propyl vinyl ethers being preferred.

The vinyl esters include vinyl acetate, vinyl propionate, and vinyl butyrates and the like with vinyl acetate being preferred.

The monovinyl aromatic monomers include styrene, alpha-methyl styrene, the vinyl toluenes, the vinyl xylenes and the like with styrene being preferred.

As stated hereinabove, the olefinic nitrile copolymer solution is polymerized in the presence of a preformed rubbery polymer which can be a homopolymer or copolymer of a conjugated diene monomer selected from the group consisting of butadiene-1,3, isoprene, chloroprene, bromoprene, cyanoprene, 2,3-dimethyl butadiene-1,3, 2-ethyl butadiene-1,3, 2,3-diethyl butadiene-1,3 and the like, with butadiene-1,3 and isoprene being preferred.

The conjugated diene monomer may itself be copolymerized with a comonomer selected from the group consisting of monovinyl aromatic monomers; an olefinic nitrile monomer having the structure:

$$CH_2=C-CN$$
$$|$$
$$R$$

wherein R has the foregoing designation and, an ester having the structure:

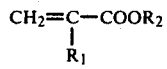

wherein $R_1$ and $R_2$ have the foregoing designations. The rubbery polymer contains from 50 to 100 percent by weight of polymerized conjugated diene monomer and from zero to 50 percent by weight of a comonomer.

Regarding the feed solution, the amount of rubbery polymer employed ranges from about five to 25 percent by weight based upon the weight of polymer and monomers present in the feed solution. Butadiene-acrylonitrile rubber polymer having an acrylonitrile content of at least 25 percent is preferred although a range of 20 to 40 percent is entirely operable.

The feed monomers make up the balance of the feed solutions, ranging in amount of from about 75 to 95 percent with 85 to 88 being preferred. For the preparation of high nitrile copolymers, the amounts of plastic forming feed monomers can range as follows: (A) from about 40 to 90 percent by weight of at least one nitrile having the structure:

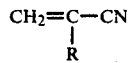

wherein R has the foregoing designation, and (B) from about 10 to 60 percent by weight of at least one member selected from the group consisting of (1) an ester having the structure:

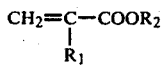

wherein $R_1$ and $R_2$ have the foregoing respective designations, (2) an alpha-olefin having the structure:

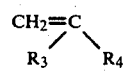

wherein $R_3$ and $R_4$ have the foregoing respective designations, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene.

Another very useful resin prepared according to the present invention is acrylonitrile-butadiene-styrene or ABS. The rubbery segment in this instance is polybutadiene-1,3, preferably having a cis content of about 98 percent. Other rubbery polymers include homopolymers of conjugated dienes having from about two to five carbon atoms and copolymers such as butadiene-acrylonitrile, butadiene-styrene and ethylene-propylene-diene rubber.

The plastic-forming monomers that can be employed are basically the olefinically unsaturated nitriles and monovinyl aromatic compounds set forth hereinabove with acrylonitrile and styrene, respectively, being preferred.

Regarding the feed solution, the amount of rubbery polymer employed ranges from about five to 25 percent by weight based upon the weight of polymer and monomers present in the feed solution. As stated hereinabove, polybutadiene having a cis content of at least 98 percent is preferred although a range of 8.0 to 100 percent is entirely operable. Average molecular weight of the rubbery polymer is from about 100,000 to about 500,000 with 300,000 being preferred.

The feed monomers make up the balance of the feed solutions, ranging in amount of from about 75 to 95 percent with 90 percent being preferred. In the preparation of ABS, the amount of acrylonitrile generally will range from about 20 to 40 percent and the styrene will be from about 60 to 80 percent. Comparable amounts of substitute monomers can be selected depending upon the desired properties of the final resin.

Not all of the monomers become polymerized in the extruder and therefore residual amounts of unreacted compounds are removed. Conversions generally run as high as about 70 percent and yield a product comprising from about 10 to 20 percent by weight rubber in the high nitrile resins and from about 15 to 25 percent by weight rubber in the ABS resins. Average molecular weights of either product can range from about 50,000 to 150,000 with 100,000 being preferred.

The polymerization of the monomers is via a bulk polymerization system for which an initiator may be employed. Suitable initiators are well-known to those skilled in the art and include the azo and organic peroxide types, which are well known to those skilled in the art.

Physical properties, namely impact strength of the resin can be improved by crosslinking as will be discussed hereinbelow. As is known to those skilled in the art, resins of the type prepared herein can be crosslinked in the presence of organic peroxides known to those skilled in the art such as dicumyl peroxide. The amount of crosslinking agent can range from about 0.10 to 0.50 percent by weight, based upon the weight of the resin.

In producing the resins from these components, other items can be added such as chain transfer agents, dyes and stabilizers. The use and amount of such items, along with the amount of initiators and crosslinking agents are all known in the art and are not the subject of the present invention.

Regarding the reactor extruder itself, a twin screw extruder is preferred. Such extruders are known and provide mating twin screws which rotate in the same direction. Different bushings are placed on the screw shafts, which provide helical screw sections for conveying, and kneading blocks for shearing, wherein controlled polymerization is allowed to occur. The specific configuration and arrangement of conveying and kneading sections selected will depend upon a plurality of factors which relate to the product being sought. Thus, screw rotation and the pitch of the conveying sections will provide control over back-pressure, throughput time and to some extent temperature. The kneading sections similarly are designed to effect control over polymerization time and temperature.

Generally speaking, the arrangement must provide for conveyance to begin at the feeding port. After a suitable temperature is reached, one or more kneading blocks are located to provide high shearing forces. When a plurality of kneading blocks are employed, which is preferred, they will be separated by conveying sections in order to move the material through the extruder. A conventional die or pelletizer head is positioned at the exit of the extruder to shape the resin for subsequent use.

Twin screw extruders of the type useful for the practice of the present invention are set forth in U.S. Pat. Nos. 3,536,680 and 3,799,234. For practice of the present invention, the feed to the extruder should be liquid which is readily facilitated by the preparation of a solution of the rubbery polymer in the monomers. Pressure in the feed section is developed by pumps which deliver the feed solution thereto. As the solution passes through the extruder and polymerization occurs, the material becomes solid. Viscous drag forces from the rotating screw create additional pressure. As is known, heat is normally added as needed by incorporating heating elements around the extruder. Similarly, heat can be controlled by suitable heating or cooling means positioned along the extruder to provide the temperatures necessary for polymerization and optimization of physical properties. As heat is generated in the reaction zones, where shearing and polymerization occur, it is usually necessary to provide suitable cooling means. The extruder is also provided with appropriate vents for the removal of volatile, unreacted monomers prior to extrusion. A flow control valve can also be incorporated to regulate the overall pressure within the extruder. Just prior to extrusion through the pelletizer die, the heat can be adjusted to the approximate melt temperature of the resin to facilitate the formation of a smooth extrudate.

Apart from the fact that the process claimed herein employs a reactor extruder as the polymerization vessel, novelty of the present invention is not premised solely on the use of such extruders per se. The process being claimed is directed more particularly to the components being fed, the use of a liquid feed solution comprising a rubbery polymer dissolved in one or more plastic forming monomers and the various polymerization conditions disclosed herein. Thus, while the twin screw reactor extruder that has been employed for practice of the present invention is available from Werner and Pfleiderer, other comparable equipment could readily be substituted.

The reactor extruder differs from most other polymerization systems in terms of physical and chemical changes that occur in the production of the rubber modified product. It is important that the feed solution be a homogeneous mixture of monomers and rubber which polymerize to form a continuous thermoplastic matrix that encapsulates a dispersed rubber phase. Rubber particle size and phase morphology are critical as the mixture undergoes a phase inversion during polymerization. Resins such as ABS, produced in the reactor extruder are slightly different in chemical and physical properties from their emulsion produced analogs. The sequence distribution of the monomer units tends to favor styrene blocking under thermal polymerization conditions. The resin from the reactor extruder offers better control over elastomer crosslink density and occluded phase volume than resin produced via conventional emulsion systems.

Figure 2:
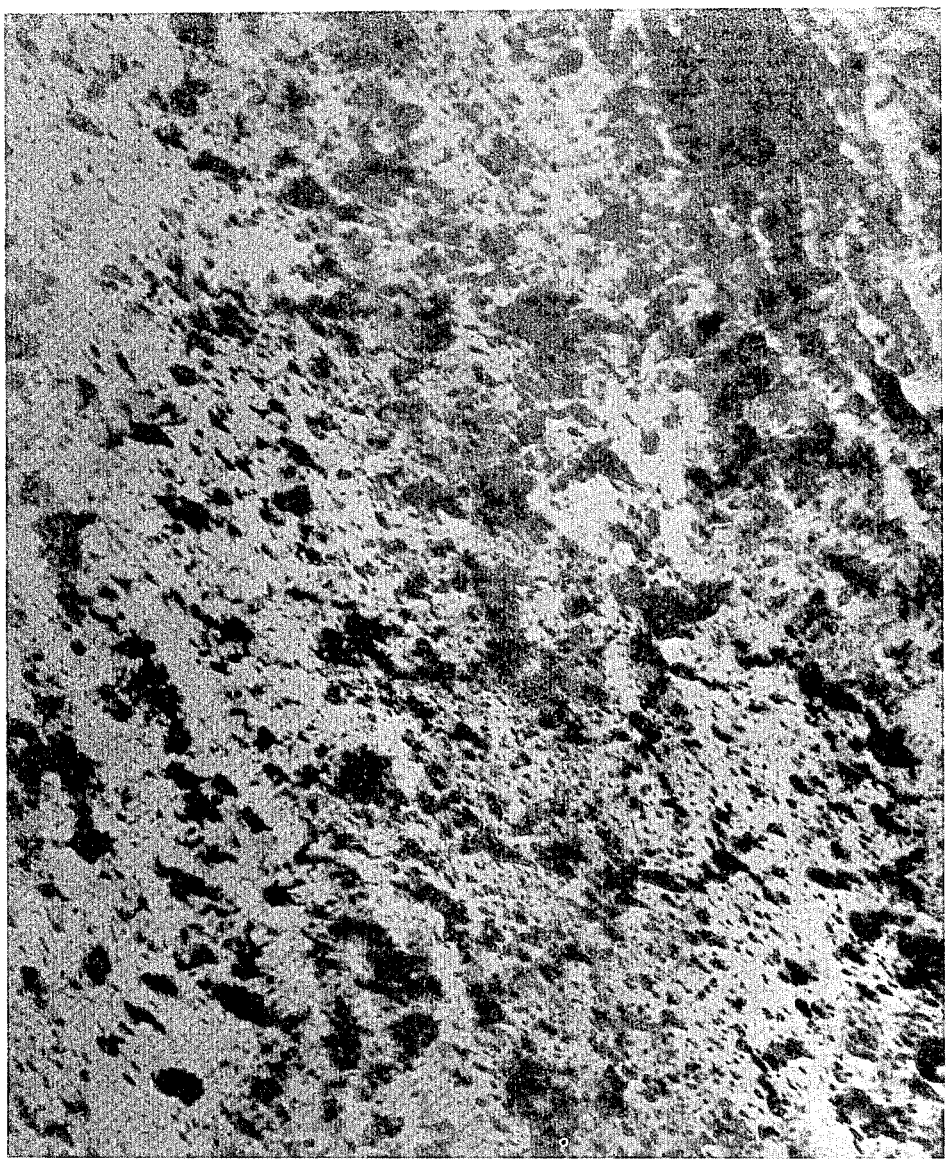
FIG. 2 is a transmission electron photomicrograph of a commercially available emulsion ABS resin for purposes of comparison with the structure depicted in FIG. 1.
Figure 3:
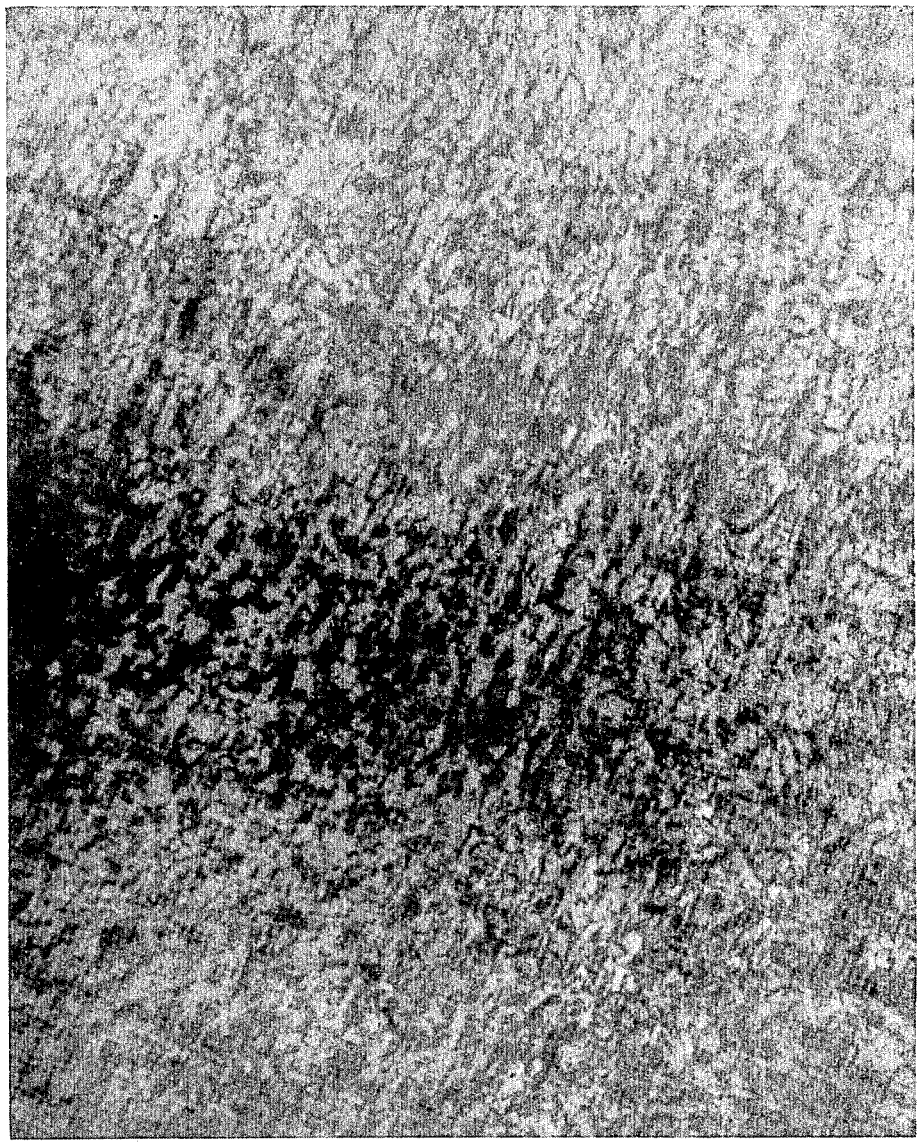
FIG. 3 is a transmission electron photomicrograph of the ABS resin depicted in FIG. 1 after curing.

A transmission electron photomicrograph of an ABS resin produced in the reactor extruder according to the process of the present invention appears in FIG. 1. The dark regions in the photograph are the rubber phase which have a uniform average size of about 0.01 to 0.50 microns and it can be noted that the distribution thereof is highly uniform. A photomicrograph of a commercially available emulsion produced ABS resin with similar rubber content and molecular weight appears in FIG. 2 and it can readily be noted that both the size of rubber particle and distribution thereof is nonuniform. Upon measurement of the impact strength of the resin depicted in FIG. 1, it was determined that greater strength would be desirable. This was facilitated by crosslinking with dicumyl peroxide, as is discussed hereinbelow. It is significant to note that after crosslinking, which did provide better impact strength, the microstructure still remained uniform as is depicted in FIG. 3, a photomicrograph of the resin of FIG. 1 following crosslinking. The bar provided in the lower right hand corner of FIGS. 1–3 is equivalent to one micron of length.

An additional distinguishing feature of the reactor extruder resin is that it possesses a higher melt flow and lower process torque than an emulsion produced ABS resin polymerized with the same components, initiator and temperature. Less processing energy is required with the former resins for injection molding applications.

In the work which is reported hereinbelow, reactor extruder resins have been produced and characterized. Properties measured and reported include molecular weight, rubber content, impact strength, tensile measurements, melt flow rheological properties, heat distortion temperature (HDT) and hardness.

The experimental work reported hereinbelow discloses the preparation of one high nitrile resin and several ABS resins with a conventional amount of acrylonitrile. In each instance the feed solution, comprising rubbery polymer polybutadiene dissolved in the plastic forming monomers is fed to the feed zone of the reactor extruder. Respective amounts of each component are specified for the various examples with reaction times, temperatures, monomer feed rates and RPM of the extruder screws. Initiators, when employed, are also indicated.

Figure 4:
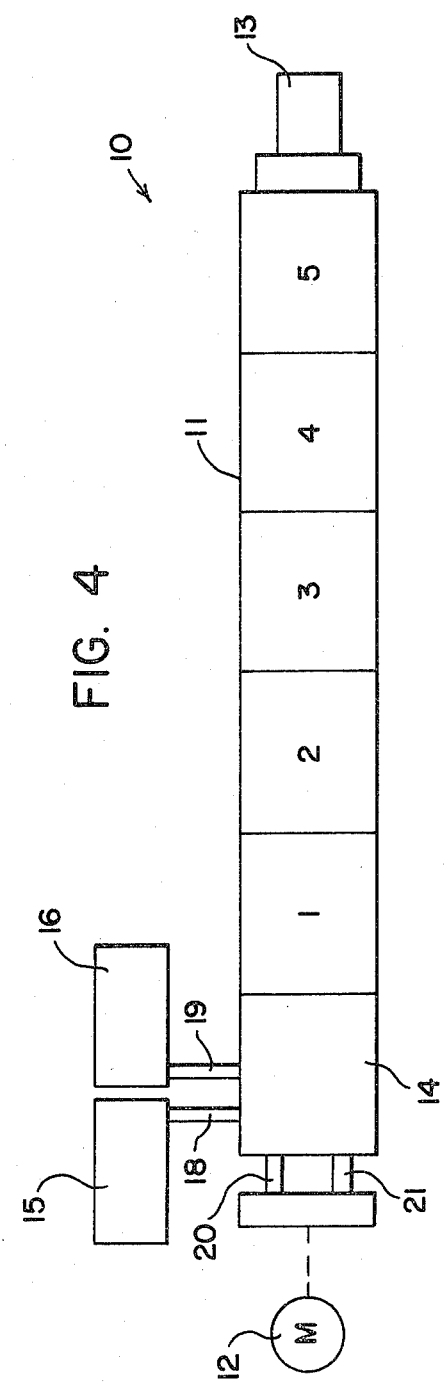
FIG. 4 is a schematic view of a twin screw reactor extruder apparatus for the preparation of rubber modified thermoplastic resins.

To aid discussion of the polymerization conducted in the reactor extruder, reference can be made to FIG. 4 which provides a schematic representation of the extruder, indicated generally by the numeral 10. The extruder 10 includes the outer barrel 11, which can be heated and cooled via means not shown, a drive motor 12 and a pelletizer head or other suitable extruder die 13. A feeding zone 14 is provided for the feed solution and initiator from independent tanks 15 and 16, respectively, connected by supply lines 18 and 19. Within the extruder 10 are twin screws driven by shafts 20 and 21. The screws, not shown, provide a combination of conveying and kneading action, as discussed hereinabove. Polymerization zones 1 to 5 are depicted which can be heated or cooled independently to control temperature, as indicated for several of the examples. Vents, not shown, can be provided to remove volatile gases as necessary.

There may also be employed additional sections (not shown) for dewatering or degasing the resin prior to final extrusion. Polymerization zones 1 to 5 contain different arrangements of conveying sections and kneading or shearing sections, as stated hereinabove. Conveying sections are usually provided in zones 1 and 5 while kneading sections will be provided in zones 2 to 4. Individual zones 2 to 4 can also contain some short conveying sections to maintain a flow of polymer as it is formed. The design or arrangement of the extruder screws does not form a part of the subject invention, inasmuch as such technology is within the skill of the art and is determined or controlled by factors such as the polymer being formed and the temperature, pressure, residence time and shear rate desired.

As stated hereinabove, the process of the present invention is practiced by dissolving a rubbery polymer in one or more plastic forming monomers to form a solution which solution is thereafter fed to the reactor extruder for polymerization. In order for polymerization to begin an initiation temperature of at least 80° C. must be reached in the feeding zone 14. While the temperature could also be obtained in zone 1 or subsequently, it is desirable that polymerization commence as soon as possible first, to form a viscous product that can be conveyed through the extruder and second, so that the polymer can be subjected to the shearing action of the kneading blocks. As will be appreciated by those skilled in the art, the use of a known initiator can result in lower initiation temperatures and/or the quicker commencement of polymerization.

The step of shearing occurs within the reactor extruder, specifically as the polymer is subjected to the kneading blocks. It is necessary for the shearing to occur and continue to such an extent that the solids content i.e., the resin product, formed is equal to about twice the elastomer content in the feed solution so that phase inversion will occur. The occurrence of phase inversion is necessary for the formation of the resins of the present invention. Initially the plastic forming monomer, or monomers, is dispersed throughout the rubbery polymer in the feed solution. As polymerization of the plastic forming monomer progresses, a point is reached where there are present more units of plastic polymer than rubber and the rubber becomes dispersed in the former.

Causing the phase inversion to occur within the reactor extruder, a feature of the process herein disclosed, results in a very small and uniform rubber particle size as well as uniform dispersion within the thermoplastic matrix.

We believe that in order for the most uniform particle size and distribution of rubber particle, the shearing within the reactor extruder, to which the feed solution and polymer is subjected, must be controlled so that an amount equal to at least twice the amount of the elastomer content present in the feed solution of solids is formed. Thus, if the elastomer content of the feed solution be equal to X, for instance 10 weight percent, then the solids content must be equal to at least 2X or 20 weight percent before shearing is complete.

The amount of shearing action can be controlled by many factors such as the temperature and pressure, screw rotation, positioning of the kneading sections and residence time within the reactor extruder. Another factor is the rubbery polymer content of the feed solution. If the content is high, that is, greater than 15 percent, then the shearing zone may extend beyond zone 3 in order to produce the two-fold increase in solids content. On the other hand, a lower rubber content feed solution may not require as long a shearing zone in order to avoid over shearing of the resin. Of course, control over the amount of shear in a longer shearing section can still be facilitated to an extent by adjusting temperature, pressure and throughput rate.

The extruder can operate at pressures of from about 100 to 500 psig so long as the feed solution is forced into the feed section at a pressure at least equal to the vapor pressure of the monomers at the maximum zone temperature being employed. If the pressure is lower, monomer gases will form which do not polymerize. Above this minimum pressure value, there is an optimum pressure range that exists but only when all other variables are held constant. In general, reaction rate increases as pressure increases. Reaction rate increases with higher pressure because the higher pressure insures that liquid monomers are forced into the voids created by previously reacted monomers, so additional reaction can take place. In general, the monomers employed herein react to polymers with a higher density than the starting monomers. There also exists an upper limit for process feed pressure. If the feed pressure is above the plastic viscous drag forces, the plastic will be pushed or forced out of the reaction/shear zone before the optimum plastic has formed, that is, one having optimum viscosity, elastomer level and elastomer crosslinking level.

With respect to temperature, the rate of reaction is directly proportional thereto. When all other variables are held constant, in particular the length and location of the shear zone, an optimum temperature range exists that reacts feed solution to a plastic in the shear zone at an optimum elastomer level. If the temperature is too high, the plastic viscosity and elastomer crosslinking level may be too high to allow shear forces to break the elastomer into the proper particle size. If the temperature is too low, the plastic may have passed through the shear zone without having reacted to the optimum elastomer level for shear forces to form the proper elastomer particle size. Temperatures can generally range from about 80° C. to as high as the melt temperature of the resin formed e.g., 177° to about 191° C.

Residence time within the reactor is a factor particularly applicable to the reaction/shear zones. It is approximately equal to the total volumetric void space of the reaction/shear zones, divided by the volumetric feed solution rate to the reactor extruder. With all other variables held constant, it is indirectly proportional to the feed solution rate. There is an optimum residence time range for any given set of variables. Too high of a feed rate could result in too short of a residence time to allow for the optimum plastic reaction to have been reached in the shear zone. Too low of a feed rate could result in too long of a residence time such that the plastic became "over reacted" or "over sheared" in the shear zone.

With respect to shear, even though a plastic is being formed in the shear zone with the optimum viscosity and elastomer level, if the optimum shear forces are not applied, the elastomer will not be broken into the proper size. Shear forces are generally varied by varying screw configuration and/or screw RPM. If all variables are held constant, including screw configuration, shear is directly proportional to screw RPM. Too little or too much shear can result in an undesirable too large or too small elastomer particle size. It is believed that a Shear Rate ranging between about 50 to 300 sec$^{-1}$ will provide the necessary shearing action. Similarly, the desired size of the elastomer particles for the resins set forth herein should range from about 0.01 to 0.50 microns.

Lastly, although not a novel step per se, properties of the resins prepared by the process of the present invention can be improved by crosslinking in the presence of a peroxide. Peroxide crosslinking can be treated as another variable which functions the same as temperature. With all other variables held constant, the rate of reaction is directly proportional to peroxide level. If the system is constrained to a certain temperature such as due to concern for thermal stability of the plastic components, peroxides can be used to insure that the plastic is at the optimum range for viscosity, rubber level and rubber crosslinking level while passing through the shear zone.

The effects of these variables are reported in the data, tables and drawings provided hereinbelow for the preparation of ABS type resins. A single high nitrile resin has also been prepared according to the process of the present invention and is reported first. Polymerization conditions and resin properties have also been provided.

Preparation of High Nitrile Copolymer Resin

Resin 1

An acrylonitrile-rubber resin was prepared in a Werner-Pfleiderer twin screw extruder having a feed section, five independently controlled temperature sections, and a die head. The screw was operated at 75 rpm. A feed solution comprising 27 grams/minute of a liquid solution of 75 parts acrylonitrile/25 parts methylacrylate/one part mercaptan chain transfer agent was fed to the feed section of the screw extruder. Dissolved in this stream was 2.45 grams/minute of an acrylonitrile/butadiene rubber polymer. To the feed section was also added 0.40 grams/minute of polymerization initiator. The feed section was at ambient temperature and 150 psig. Cooling water was used to control the temperature of the five additional reactor sections. The temperatures were as follows:

| Section 1 | 110° C. |
|---|---|
| Section 2 | 121° C. |
| Section 3 | 149° C. |
| Section 4 | 160° C. |
| Section 5 | 177° C. |
| Die head | 177° C. |

20.8 grams/minute of resin was produced with a total monomer conversion of 77 percent. The estimated residence time in the extruder was 4 minutes. The resin was then tested for notched Izod and found to have a value of 1.65 ft lbs/inch. Resins made in the extruder not containing the rubbery polymer were prepared for comparison and found to have a notched Izod of approximately 0.11. A polymer is considered to have good impact resistance if the notched Izod has a value about 0.5. Thus, the process of the present invention provides high nitrile copolymer resins having an unexpectedly high value for impact resistance.

Preparation of ABS Resins Under Various Processing Conditions

The resins reported hereinbelow were prepared using styrene (S), acrylonitrile (An), and polybutadiene rubber (BR). Polybutadiene utilized was Taktene 1202 or 502, the properties of which are set forth in Table V hereinbelow. All parts are presented on a weight percent basis. The polymerizations were initiated by heat unless otherwise noted. Several of the resins were cured in the presence of an organic peroxide either after formation by addition of the peroxide to the resin on a two roll mill or, initially by addition of the peroxide to the reactor extruder. Twenty-five of the resins discussed herein were analyzed and are reported in Tables I to III which follow. Table I provides physical characteristics of the resins and Tables II and III provide resin properties.

Resin 2

| | |
|---|---|
| Feed solution: | 82.1% S, 17.9% An and 13.7% Taktene 1202 |
| Temperature: | 149° C. zones 1 to 5 and die |
| Resin Prepared: | |
| No. 2: | Solid strand type material obtained at a rate of 15 grams/3 min. |

Resins 3-4

| | |
|---|---|
| Feed solution: | 82.1% S, 17.9% An and 13.7% Taktene 1202 |
| Temperature: | 149° C. zones 1 to 5, 177° C. die |
| Initiator: | Luazo 70 as indicated |
| Resins Prepared: | |
| No. 3: | Glossy material obtained during start up with initiator |
| | Feed Rates: Monomer 38 cc/min |
| | Initiator 17% |
| | Product properties: MW = 58,300 |
| | % rubber in resin 21.6 |
| | % An in resin 22.0 |
| | Additional properties appear in Tables I to III |
| No. 4: | Solid polymer product obtained without initiator |
| | Feed rates: Monomer 38 cc/min |
| | Product properties: MW = 92,100 |
| | % rubber in resin 20.5 |
| | % An in resin 21.8 |

Resins 5-8

| | |
|---|---|
| Feed Solution: | 77.2% S, 22.8% An, 8.3% Taktene 1202 |
| Temperature: | 149° C. zones 1 to 5, die 177° C. |
| No. 5: | Feed rates: Monomer 25 cc/min |
| | Product rate: 28 grams/3 min |
| | Product properties: MW = 152,300 |
| | % rubber in resin 21.0 |
| | % An in resin 20.3 |
| No. 6: | Feed rates: Monomer 25 cc/min |
| | Product rate: 29 grams/3 min |
| | Product properties: MW = 163,600 |
| | % rubber in resin 25.5 |
| | % An in resin 21.1 |
| No. 7: | Feed rates: Monomer 25 cc/min |
| | Product rates: 27 grams/3 min |
| | Product properties: MW = 156,200 |
| | % rubber in resin 22.2 |
| | % An in resin 22.4 |
| No. 8: | This sample represents a composite of Resins 5, 6 and 7 that were ground up and dry blended to obtain a large, representative sample for further processing. The combined Resin 8 was dried in a vacuum oven for one week during which time it lost about 7.0% of its total weight. Properties of Resin 8 appear in Tables I to III |

Resins 9-12

| | |
|---|---|
| Feed Solution: | (1) 75.8% S, 24.2% An, 8.4% Taktene 1202 |
| | (2) 77.2% S, 22.8% An, 8.8% Taktene 502 |
| Temperature: | 149° C. zones 1 to 5, die 177° C. |
| No. 9: | Feed rates: Monomer 18 cc/min, solution 2 |
| | Product rate: 32.5 grams/3 min |
| | Product properties: MW = 115,500 |
| | % rubber in resin 16.3 |
| | % An in resin 22.2 |
| No. 10: | Feed rates: Monomer 18 cc/min, solution 2 |
| | Product rates: 26.4 grams/3 min |
| | Product properties: MW = 137,800 |
| | % rubber in resin 20.4 |
| | % An in resin 21.6 |
| | Additional properties appear in Tables I to III |
| No. 11: | Feed rates: Monomer 25 cc/min switched from solution 2 to 1 |
| | Product properties: MW = 134,700 |
| | % rubber in resin 29.1 |
| | % An in resin 23.5 |
| No. 12: | Feed rates: Monomer 25 cc/min |
| | Product rate: 34.5 grams/3 min |
| | Product properties: MW = 129,600 |
| | % rubber in resin 15.8 |
| | % An in resin 21.8 |

Resins 13-15

| | | |
|---|---|---|
| Feed solution: | 78.5% S, 21.5% An, 8.9% Taktene 502 | |
| Temperature: | 149° C. zones 1 to 5, die 177° C. | |
| No. 13: | Feed rates: | Monomer 25 cc/min at 18 RPM |
| | Product rate: | 36 grams/3 min |
| No. 14: | Feed rates: | Monomer 25 cc/min at 18 RPM |
| | Product rate: | 26.7 grams/3 min |
| No. 15: | Special composite resin made by grinding and combining Resins 13 and 14, which were then dried at 130° C. for 1 hour. | |

Resins 16-24

| | | |
|---|---|---|
| Feed solutions: | (1) 77.0% S, 23.0% An, 10.4% Taktene 502 | |
| | (2) 77.1% S, 22.9% An, 14.6% Taktene 502 | |
| No. 16: | Feed rates: | Monomer 22 cc/min, 20 RPM, solution 1 |
| | Temperature: | 149° C. zones 1 to 5, die 177° C. |
| | Product rate: | 11.9 grams/min |
| No. 17: | Feed rate: | Monomer 29 cc/min at 20 RPM |
| | Temperature: | 163° C. zones 1 to 5, die 177° C. |
| | Product rate: | 15.4 grams/min (150 psi feed port) |
| No. 18: | Feed rate: | Monomer 35 cc/min at 20 RPM |
| | Temperature: | 163° C. zones 1 to 5, die 177° C. |
| | Product rate: | 20.2 grams/min (170 psi feed port) |
| No. 19: | Feed rate: | Monomer 54 cc/min at 25 RPM |
| | Temperature: | 163° C. zones 1 to 5, die 177° C. |
| | Product rate: | 22 grams/min (150 psi feed port) |
| No. 20: | Feed rate: | Monomer 45.7 cc/min at 25 RPM |
| | Temperature: | 163° C. zones 1 to 5, die 177° C. |
| | Product rate: | 13.8 grams/min (132 psi feed port) |
| No. 21: | Feed rate: | Monomer 60 cc/min at 15 RPM |
| | Temperature: | 177° C. zones 1 to 5, die 177° |
| | Product rate: | 22.6 grams/min (180 psi feed port) |
| No. 22: | Feed rate: | Monomer 38 cc/min at 15 RPM |
| | Temperature: | 204° C. zones 1 to 5, die 177° C. |
| | Product rate: | 29 grams/min (255 psi feed port) |
| No. 23: | Feed rate: | Monomers 30 cc/min at 28 RPM |
| | Temperature: | 163° C. zones 1 to 5, die 177° C. |
| | Product rate: | 10.9 grams/min (115 psi feed port) |
| No. 24: | Feed rate: | Monomer 13 cc/min at 31 RPM |
| | Temperature: | 149° C. zones 1 to 5, die 177° C. |
| | Product rate: | 7.5 grams/min (100 psi feed port) |

Properties for Resins 16-24 appear in Tables I to III

Resins 25-32

For this series, the effect of peroxide addition on physical properties was evaluated. Resins 20 and 21 were separately blended on a two roll mill for 15 min at 190° C. with peroxide levels as indicated for each of the examples 25-32 hereinbelow. Resins 25-32 are not reported in Tables I to III, but Notched Izod values have been presented for comparison with other resins which were not crosslinked.

| | |
|---|---|
| No. 25: | Resin 20 processed with 0 grams of dicumyl peroxide (Di cup) Notched Izod 6.45 ft lbs/in notch |
| No. 26: | Resin 20 processed with 0.1 wt % Di cup Notched Izod 7.0 ft lbs/in notch |
| No. 27: | Resin 20 processed with 0.25 wt % Di cup Notched Izod 6.78 ft lbs/in notch |
| No. 28: | Resin 20 processed with 0.50 wt % Di cup Notched Izod 6.75 ft lbs/in notch |
| No. 29: | Resin 21 processed with 0 grams Di cup Notched Izod 0.99 ft lbs/in notch |
| No. 30: | Resin 21 processed with 0.1 wt % Di cup Notched Izod 4.48 ft lbs/in notch |
| No. 31: | Resin 21 processed with 0.25 wt % Di cup Notched Izod 4.36 ft lbs/in notch |
| No. 32: | Resin 21 processed with 0.50 wt % Di cup Notched Izod 4.04 ft lbs/in notch |

Resins 33-37

| | | |
|---|---|---|
| Feed solution: | 78.5% S, 21.5% An, 10.4% Taktene 502 | |
| Temperature: | 177° C. on all zones and die | |
| No. 33: | Not a true steady state product, but collected anyway | |
| No. 34: | Still not a true steady state product, but collected. Products 33 and 34 were then combined and treated as Resin 34. | |
| | Product properties: | MW = 106,000 |
| | | % rubber in resin 24.5 |
| | | % An in resin 24.4 |
| | Notched Izod 1.69 ft lbs/in notch | |
| No. 35: | Feed rates: | Monomer 50 cc/min at 19 RPM |
| | Product rate: | 25.85 grams/min |
| | Product properties: | MW = 91,600 |
| | | % rubber in resin 20.7 |
| | | % An in resin 24.5 |
| | | Notched Izod 0.18 ft lbs/in notch |
| No. 36: | Resin 34 was also treated with Di cup and processed on a two roll mill for 15 min at 160° C. | |
| | Product properties: | Notched Izod 5.20 ft lbs/in notch |
| No. 37: | Resin 35 was also treated with Di cup and processed on a two roll mill for 15 min at 160° C. | |
| | Product properties: | Notched Izod 0.60 ft lbs/in notch |

Resins 38-45

| | | |
|---|---|---|
| Feed solution: | 74.06% S, 25.94% An, 10.85% Taktene 502 | |
| Temperature: | 163° C. zones 1 to 5, die 177° C. | |
| No. 38: | Feed rate: | Monomer 30 cc/min at 28 RPM |
| | Product rate: | 20.33 grams/min (180 psi feed port) |
| | Product properties: | MW = 93,800 |
| | | % rubber in resin 14.75 |
| | | % An in resin 24.74 |
| | Good steady state product | |
| No. 39: | Feed rate: | Monomer 40 cc/min at 28 RPM |
| | Product properties: | MW = 119,900 |
| | | % rubber in resin 40.15 |
| | | % An in resin 21.95 |
| | Unstable operation/nonsteady state | |
| No. 40: | Feed rate: | Monomer 40 cc/min at 28 RPM |
| | Product rate: | 12.5 grams/min |
| | Product properties: | MW = 134,500 |
| | | % rubber in resin 48.98 |
| | | % An in resin 21.55 |
| | | Notched Izod 2.73 ft lbs/in notch |
| | Good steady state product | |
| No. 41: | Feed rate: | 45 cc/min at 28 RPM |
| | Product properties: | MW = 133,200 |
| | | % rubber in resin 50.0 |
| | | % An in resin 24.55 |
| No. 42: | Feed rate: | Varied during sample |
| | Product properties: | MW = 122,600 |
| | | % rubber in resin 51.28 |
| | | % An in resin 22.64 |
| No. 43: | Feed rate: | Not known |
| | Product properties: | MW = 126,500 |
| | | % rubber in resin 48.72 |

-continued

|  |  |  |
|---|---|---|
|  |  | % An in resin 22.56 |
|  |  | Notched Izod 3.38 |
|  |  | ft lbs/in notch |
|  | Last sample before peroxide was added to the feed |  |
| No. 44: | Feed rate: | Monomer 70 cc/min at 35 RPM |
|  |  | Initiator: 7 cc/min (25 wt % solution of Di cup) |
|  | Product rate: | 30–35 grams/min |
|  | Additional properties appear in Tables I to III |  |
| No. 45: | Feed rate: | Monomer 25 cc/min at 22 RPM |
|  |  | Initiator 0.7 cc/min composed of 25 wt % Di cup plus 50 wt % Polygard |
|  | Product rate: | 13.4 grams/min (105 psi feed port) |
|  | Product properties: | MW = 82,800 |
|  |  | % rubber in resin 24.70 |
|  |  | % An in resin 20.42 |
|  |  | Notched Izod 0.95 ft lbs/in notch |
|  |  | Brabender 390 M-grams |

Resins 46–57

Feed solution: 80.48% S, 19.52% An, 12.4% Taktene 502
Temperaure: 171° C. zones 1 to 5, die 177° C.
Feed rate: 44 cc/min at 19 RPM
Product rate: 28.5 grams/min The product from this run was made over a continuous 80 hour operation in order to produce a large quantity of resin for subsequent work. Inasmuch as one product was desired, conditions were not varied. Resins 46–54 were each produced during one, eight hour shift. Properties for Resins 46–57 are presented in Tables I to III.

No. 55: Composite sample of Resins 46–54, dried for one-half hour at 70° C.
No. 56: Resin 55 melt blended on a two roll mill at 160° C. for 15 min with 0.2 wt % Di cup
No. 57: Resin 56 that was dried in a fluid bed drier for 2½ hours at 70° C.

TABLE I

| Resin No. | Composition | | | Residual Monomers | | Molecular Weight | |
|---|---|---|---|---|---|---|---|
|  | S (wt %) | An (wt %) | BR (wt %) | S (ppm) | An (ppm) | Mn 10³ | Mw 10³ |
| 3 | 65.1 | 34.9 | 25.9 | 265 | 4000 | 34.00 | 106.3 |
| 8 | 78.54 | 21.46 | 23.01 | 10400 | 43 | 43.40 | 154.8 |
| 10 | 78.4 | 21.6 | 20.4 | — | — | — | 137.0 |
| 16 | 86.6 | 23.4 | 17.64 | 38800 | 745 | 28.25 | 123.0 |
| 17 | 75.0 | 25.0 | 16.58 | 18600 | 500 | 33.60 | 111.6 |
| 18 | 76.9 | 23.1 | 17.23 | 18300 | 175 | 30.70 | 107.9 |
| 19 | 75.7 | 24.3 | 22.1 | 36500 | 840 | 37.90 | 123.8 |
| 20 | 75.3 | 24.7 | 29.8 | 27300 | 260 | 43.70 | 130.9 |
| 21 | 75.9 | 24.1 | 25.9 | 1760 | 680 | 37.20 | 108.5 |
| 22 | 75.6 | 24.4 | 13.6 | 870 | 120 | 12.60 | 47.5 |
| 23 | 76.9 | 23.1 | 28.8 | 34100 | 525 | 38.40 | 127.8 |
| 24 | 76.7 | 23.3 | 28.5 | 27200 | 580 | 27.50 | 116.4 |
| 44 | 77.0 | 23.0 | 26.01 | 2322 | 290 | 35.50 | 100.4 |
| 46 | 75.3 | 24.7 | 11.36 | 13.10ᵃ | 495 | — | 89.0 |
| 47 | 73.6 | 26.4 | 17.70 | 12.68ᵃ | 300 | — | 106.0 |
| 48 | 74.1 | 25.9 | 18.53 | 2.27ᵃ | 285 | — | 103.0 |
| 49 | 74.1 | 25.9 | 18.06 | 2.77ᵃ | 290 | — | 94.5 |
| 50 | 74.2 | 25.8 | 16.85 | 3.39ᵃ | 200 | — | 100.5 |
| 51 | 73.7 | 26.3 | 18.70 | 2.56ᵃ | 195 | — | 84.2 |
| 52 | 74.6 | 25.4 | 15.80 | 3.74ᵃ | 540 | — | 101.2 |
| 53 | 74.5 | 25.5 | 17.97 | 2.64ᵃ | 205 | — | 105.0 |
| 54 | 74.5 | 25.7 | 21.19 | 2.08ᵃ | 230 | — | 104.2 |
| 55 | — | — | — | — | — | — | 96.1 |
| 56 | 75.1 | 24.9 | 13.68 | — | — | — | 104.0 |
| 57 | — | — | — | — | — | — | 96.8 |

ᵃ% S

TABLE II

| Resin No. | Notched Izod ft lbs/in | Hardness (RWR) | Brabender Torque (M-grams) | Melt Flow Index (grams/10 min) |
|---|---|---|---|---|
| 3 | 5.22 | .68ᵃ | 810 | 1.88 |
| 8 | 1.96 | — | 920 | — |
| 10 | 3.05 | — | — | — |
| 16 | 2.39 | 100 | 530 | 23.30 |
| 17 | 3.37 | 100 | 570 | 18.20 |
| 18 | 1.85 | 97.5 | 670 | 5.03 |
| 19 | 2.06 | 95 | 750 | 2.41 |
| 20 | 3.46 | 79 | 950 | — |
| 21 | 0.43 | 100 | 550 | 5.64 |
| 22 | 0.11 | 106 | 160 | — |
| 23 | 4.29 | 72 | 1000 | 0.21 |
| 24 | 1.51 | 50 | 860 | 5.72 |
| 44 | 2.37 | — | — | — |
| 46 | 0.29 | — | 590 | 5.36 |
| 47 | 0.46 | — | — | — |
| 48 | 0.45 | — | 670 | 1.74 |
| 49 | 0.39 | — | — | — |
| 50 | 0.43 | — | 570 | 6.26 |
| 51 | 0.22 | — | — | — |
| 52 | 0.65 | — | 550 | 5.16 |
| 53 | 0.60 | — | — | — |
| 54 | 0.70 | — | 620 | 3.53 |
| 55 | 0.40 | — | 370 | 11.6 |
| 56 | — | — | — | — |
| 57 | 2.39 | — | 350 | 15.09 |

ᵃShore D

TABLE III

| Resin No. | Flex Strength × 10³ (psi) | Flex Modulus × 10⁵ (psi) | Elong. at Yield % | Elong. at Break % | Tensile Modulus × 10⁵ (psi) | Yield Strength × 10³ (psi) | Break Strength × 10³ (psi) |
|---|---|---|---|---|---|---|---|
| 3 | 4.78 | 1.75 | 3.3 | 31.2 | 1.94 | 2.78 | 2.34 |
| 8 | — | — | — | — | — | — | — |
| 10 | — | — | — | — | — | — | — |
| 16 | 7.53 | 2.99 | 2.2 | 6.6 | 3.10 | 4.51 | 3.99 |
| 17 | 7.70 | 3.11 | 2.1 | 5.3 | 3.15 | 4.74 | 4.15 |
| 18 | 7.66 | 2.81 | 2.1 | 6.0 | 3.13 | 4.62 | 4.09 |
| 19 | 7.46 | 2.93 | 2.1 | 8.4 | 2.90 | 4.52 | 3.77 |
| 20 | 5.10 | 2.05 | 2.1 | 7.8 | 2.44 | 3.39 | 2.91 |
| 21 | 7.61 | 3.02 | 2.0 | 4.3 | 3.18 | 4.64 | 4.34 |
| 22 | 2.38 | 3.40 | — | 0.5 | 3.53 | — | 1.87 |
| 23 | 5.62 | 2.32 | 2.2 | 6.0 | 2.49 | 3.44 | 2.98 |
| 24 | 3.58 | 1.29 | 3.9 | 59.0 | 1.65 | 2.30 | 2.37 |
| 44 | — | — | — | — | — | — | — |
| 46 | 8.64 | 3.17 | — | — | 3.05 | — | — |

TABLE III-continued

| | | | Resin Tensile Properties | | | | |
|---|---|---|---|---|---|---|---|
| Resin No. | Flex Strength × 10³ (psi) | Flex Modulus × 10⁵ (psi) | Elong. at Yield % | Elong. at Break % | Tensile Modulus × 10⁵ (psi) | Yield Strength × 10³ (psi) | Break Strength × 10³ (psi) |
| 47 | — | — | — | — | — | — | — |
| 48 | 8.99 | 3.31 | — | — | 3.06 | — | — |
| 49 | — | — | — | — | — | — | — |
| 50 | 8.17 | 3.13 | — | — | 2.88 | — | — |
| 51 | — | — | — | — | — | — | — |
| 52 | 8.11 | 3.12 | — | — | 2.94 | — | — |
| 53 | — | — | — | — | — | — | — |
| 54 | 8.13 | 3.18 | — | — | 2.91 | — | — |
| 55 | 8.36 | 3.26 | — | — | 3.16 | — | — |
| 56 | — | — | — | — | — | — | — |
| 57 | 8.63 | 2.98 | — | — | 2.96 | — | — |

In addition to the foregoing data regarding the preparation and characterization of resins produced according to the present invention, the influence of temperature on molecular weight of the product and conversion of monomers is also discussed.

Figure 5:
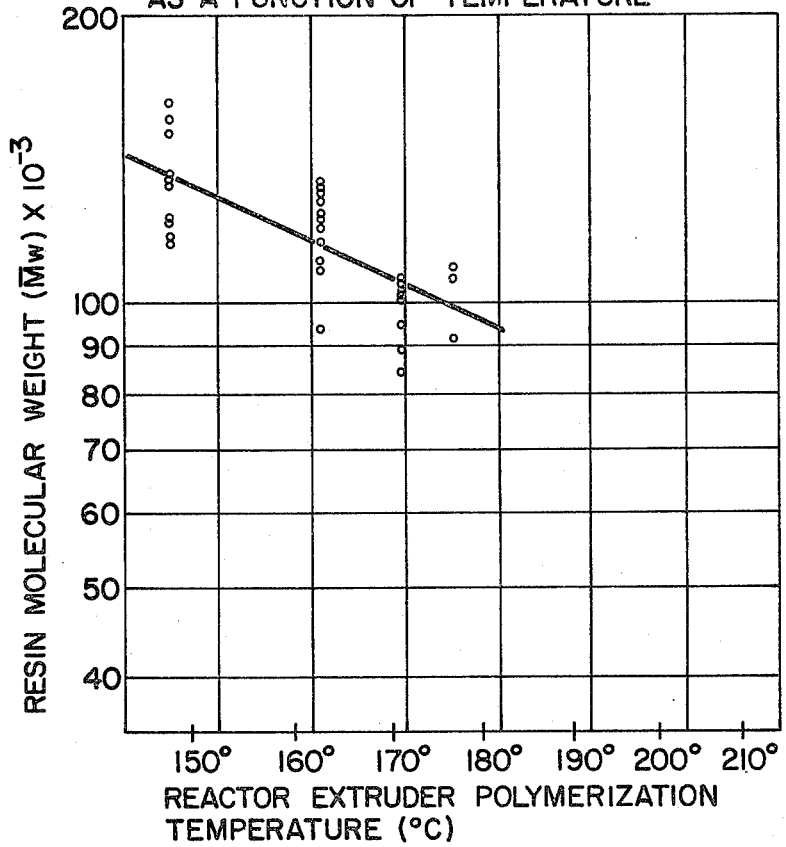
FIG. 5 graphically depicts the plot of weight average molecular weight of various ABS resins, produced according to the process of the present invention, against polymerization temperature.

With reference to FIG. 5, the temperature at which the polymerization is conducted and its effect on weight average molecular weight is depicted for polymerizations conducted between the temperatures of 147° C. and about 177° C. A plurality of data points were collected for the various resins discussed hereinabove, and as is evident from the slope of the line in FIG. 5, the molecular weight of reactor extruder produced thermally initiated ABS resins decreases rapidly as the temperature increases. From this evaluation we have determined that molecular weights comparable to commercially available ABS resins can be obtained at temperatures between about 165° and 190° C.

Figure 6:
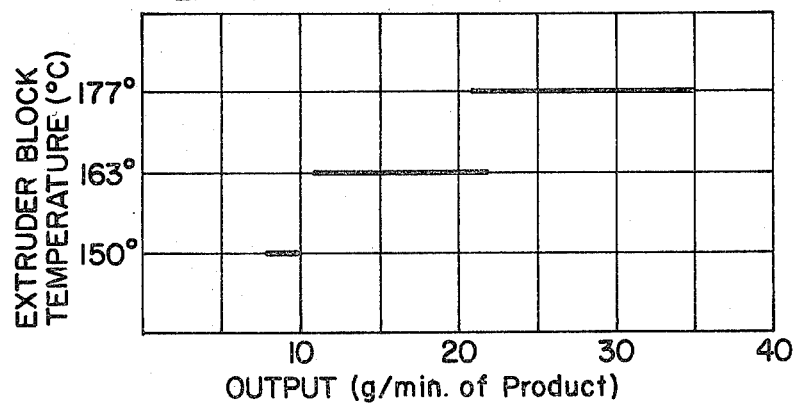
FIG. 6 graphically depicts the effect of temperature on the output rate of ABS resins, produced according to the present invention.

Increasing the polymerization temperature will also increase the conversion and overall output as is shown in FIG. 6. At temperatures of 177° C. for instance, the grams of resin produced per minute overlaps slightly the highest output of resin at the lower temperature 163° C., but then quickly exceeds it, extending to about 35 grams per minute.

The rate of feed has been found to have a primary effect on per pass conversion and output. Higher feed rates also have an effect on the internal pressure drive of the reactor extruder by increasing the feed port pressure. Although a high feed port pressure can be compensated for by increasing the extruder RPM, there exists some evidence that a higher feed port pressure may improve machine conversion. Table IV tabulates two sets of data that illustrate the effect of pressure on conversion. By comparing the reported operating pressures with the respective conversions for Resins 19 and 20 as a pair and for Resins 58 and 59, it can be observed that the conversion was increased with higher operating pressures.

The effect that a given rubber type has on impact strength was also evaluated. Basically, a high "cis" polybutadiene was chosen because it exhibits the lowest glass transition temperature, fastest dissolving time and highest heat stability of any polybutadiene.

We elected Taktene for the experimental work, which is supplied by Polysar Ltd., of Sarnia Canada. It cannot be emulsified and is used exclusively for impact modification of polystyrene in bulk or bulk/suspension HIPS processes.

Table V lists the selected properties of three varieties of "high cis" Taktene polybutadienes. The key difference between types is the solution viscosities developed when dissolved in monomer mixtures. For characterization purposes, the HIPS industry recognizes a 5 wt % rubber in styrene monomer as a standard concentration for comparison. Taktene 502/Lot 13 has the lowest solution viscosity and is reported to yield superior properties in the impact modification of polystyrene over the other grades of Taktene.

TABLE V

| | Characterizing Properties of the Taktene 1202 and Taktene 502 Samples | | |
|---|---|---|---|
| Rubber Identification | Taktene 1202 Lot 14 | Taktene 1202 Lot 863 | Taktene 502 Lot 13 |
| Bulk Polymer Properties | | | |
| Mooney Viscosity (ML₁₊₄ at 100° C.) | 41.0 | 39.0 | 28.0 |
| Ash (wt %) | 0.08 | 0.10 | 0.08 |
| Volatiles (wt %) | 0.24 | 0.26 | 0.20 |
| Stabilizer*a* (wt % by addition) | 0.6 | 0.6 | 0.6 |
| Solution Properties (as a 5 w/w % solution in styrene monomer) | | | |
| Fluid Viscosity (mPa · s.) | 78.9 | 60.0 | 35.5 |
| APHA Color | 7.5 | 7.5 | 7.5 |
| Notched Izod for each Rubber Incorporated into ABS Resin | | | |
| Ft lbs/in Notch | 1.58 | 2.70 | 3.05 |

TABLE IV

| | | Effect of Pressure on Conversion | | | | | |
|---|---|---|---|---|---|---|---|
| Resin No. | RPM | % Rubber (feed) | Run Temp. | Feed Rate (cc/min) | % Rubber (Product) | Per Pass Conversion | Operating Pressure (psi) |
| 19 | 25 | 10.4 | 163° C. | 54 | 22.1 | 47.1 | 170 |
| 20 | 25 | 10.4 | 163° C. | 45.7 | 29.8 | 35 | 132 |
| 58*a* | 16 | 10.3 | 171° C. | 32 | 20.1 | 51.2 | 130 |
| 59*a* | 16 | 10.3 | 171° C. | 44 | 17.3 | 59.4 | 240 |

*a*Resins 58–59 similar to Resins 46–57 with extruder RPM of 16 rather than 19

*a*Stabilizer system comprises
Irganox 1076 - 0.15 wt %
Polygard HR - 0.45 wt %

The resulting impact strengths when each of the three rubbers were incorporated into an ABS resin in the reactor extruder is also provided in Table V. The weight fraction of each rubber in the resin was as follows: 1202/Lot 14 15.8%; 1202/Lot 863 23.28%; and 502/Lot 13 20.33%. The best performance, in terms of absolute Izod came from the Taktene 502/Lot 13 elastomer which was primarily utilized for experimental work conducted and reported hereinabove.

As can be noted from the data provided in the Tables, impact strength as well as processing properties can be varied with feed viscosity, temperature, pressure, feed rates and the like. The effect of peroxide addition is also reported for two ABS resins having different rubber contents. With reference to Resins 25-28, Resin 20, containing 29.8 weight percent of butadiene rubber was passed through a two roll mill with increasing amounts of dicumyl peroxide. Notched Izod for Resin 20 was good at 3.46; after milling for 15 minutes without any peroxide Izod was increased to 6.45; with peroxide the Izod was increased even more but notably the greatest increase came with the lowest amount of peroxide, 0.1 weight percent while additional amounts were not as effective. With reference to Resins 2932, Resin 21, containing 25.9 weight percent of butadiene rubber was treated with and without dicumyl peroxide as discussed hereinabove. The results were similar with peroxide addition at the 0.1 weight percent being the most effective.

In conclusion, it is to be understood that practice of the process of the present invention should not be limited to a particular reactor extruder so long as the necessary shear is provided while the polymer resin is forming. Likewise, so long as a feed solution is prepared by dissolving a rubbery polymer in one or more plastic forming monomers, selection of the various monomers and rubbery polymers can be made based upon the type of thermoplastic resin sought and it is believed that the use of particular components as well as the amounts thereof can be made depending upon the resin properties desired. Similarly, control over the process regarding temperature, pressure, throughput rate, residence time, Shear Rate and the like can be varied as desired depending upon the reactor extruder employed and the resin to be prepared.

Thus, it can be seen that the disclosed invention carries out the objects set forth hereinabove. It is believed that the variables disclosed herein can readily be determined and controlled without departing from the spirit of the invention herein disclosed and described. Moreover, the scope of the invention shall include all modifications and variations that fall within the scope of the attached claims.

We claim:

1. A process for preparing resin comprising the reaction product of a rubbery polymer with one or more ethylenically-unsaturated monomers comprising the steps of:

introducing a mixture of the rubbery polymer and one or more ethylenically unsaturated monomers into a feed section of a screw extruder, wherein at least one of said monomers is selected from the group consisting of olefinically unsaturated nitriles having the structure

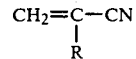

wherein R is hydrogen, a lower alkyl group having from 1 to 4 carbon atoms or a halogen;

polymerizing the monomers with the rubbery polymer in one or more additional reaction sections of the extruder, each section containing means to remove the heat of reaction to control the temperature therein; and extruding the copolymer formed at its melt temperature through a die head to produce the resin.

2. The process of claim 1, wherein the rubbery polymer is selected from the group consisting of conjugated diene homopolymers having from two to five carbon atoms, copolymers thereof with monovinyl aromatic monomers having from eight to about 20 carbon atoms, olefinic nitrile monomers having the structure

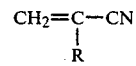

wherein R is hydrogen, a lower alkyl group having from 1 to 4 carbon atoms or a halogen;

esters of olefinically unsaturated carboxylic acids having the structure

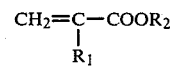

wherein $R_1$ is hydrogen, an alkyl group having from 1 to 30 carbon atoms, or a halogen, and $R_2$ is an alkyl group having from 1 to 6 carbon atoms;

and ethylene-propylene-diene rubber.

3. The process of claim 2 wherein the rubbery polymer is selected from the group consisting of butadiene/acrylonitrile, butadiene/styrene, polybutadiene and ethylene-propylene diene rubber.

4. The process of claim 3 wherein the rubbery polymer is butadiene/acrylonitrile.

5. The process of claim 4 wherein the ethylenically unsaturated monomers are acrylonitrile and methylacrylate.

6. The process of claim 2, wherein the ethylenically unsaturated monomer is further selected from the group consisting of esters of olefinically unsaturated carboxylic acids having the structure

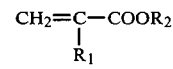

wherein $R_1$ is hydrogen, an alkyl group having from 1 to 30 carbon atoms, or a halogen, and $R_2$ is an alkyl group having from 1 to 6 carbon atoms;

alpha-olefins having the structure

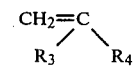

wherein $R_3$ and $R_4$ are alkyl groups having from 1 to 7 carbon atoms; monovinyl aromatic compounds having from eight to about 20 carbon atoms;

vinyl acetate, vinyl propionate, the vinyl butyrates, methyl vinyl ether, ethyl vinyl ether, propyl vinyl ethers, and butyl vinyl ethers, methyl isopropenyl ether, ethyl isopropenyl ether and mixtures thereof.

7. The process of claim 6 wherein the ethylenically unsaturated monomers are further selected from the group consisting of styrene, acrylic acid, methylacrylate and mixtures thereof, and wherein said olefinically unsaturated nitrile is acrylonitrile.

8. The process of claim 6 wherein said feed solution comprises:
butadiene/acrylonitrile rubber as said rubbery polymer;
acrylonitrile as said olefinically unsaturated nitrile; and
methylacrylate as said ester.

9. The process of claim 8, wherein the composition of said feed solution comprises from about 10 to 20 weight percent rubbery polymer and the resin produced has a Notched Izod value of greater than 0.5 ft lbs/in.

10. The process of claim 6, wherein said feed solution comprises:
butadiene rubber as said rubbery polymer;
acrylonitrile as said olefinically unsaturated nitrile; and
styrene as said monovinyl aromatic compound.

11. The process of claim 10, wherein the composition of said feed solution comprises from about 10 to 20 weight percent rubbery polymer and the resin produced has a Notched Izod value of greater than 1.0 ft lbs/in.

12. The process of claim 1 wherein the extruder contains a dewatering section between the reaction section and the die head.

13. The process of claim 1 wherein the extruder contains a degasing section between the reaction section and the die head.

14. The process of claim 1 wherein the extruder is a twin screw extruder.

15. The process of claim 1 wherein the resin produced has a notched Izod of greater than 0.5.

16. A process for the impact modification of a plastic with a rubbery polymer to form a thermoplastic resin in a reactor extruder comprising the steps of:
dissolving a rubbery polymer in at least one ethylenically unsaturated monomer to form a feed solution, wherein at least one of said monomers is selected from the group consisting of olefinically unsaturated nitriles having the structure

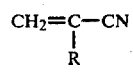

wherein R is hydrogen, a lower alkyl group having from 1 to 4 carbon atoms or a halogen;
introducing said feed solution into the feed section of a twin screw reactor extruder;
heating said feed solution under pressure to a temperature sufficient for polymerization to begin;
shearing said feed solution until the solids content formed is equal to at least about twice the rubber content in said feed solution to produce a phase inversion product wherein discrete particles of rubber become encapsulated in a continuous phase of plastic polymer formed from said ethylenically unsaturated monomer;

thereafter reacting said phase inversion product until at least about 70 weight percent of said feed solution has been converted to a thermoplastic resin; and,
extruding said thermoplastic resin through a die.

17. The process of claim 16, wherein the rubbery polymer is selected from the group consisting of conjugated diene homopolymers having from two to five carbon atoms, copolymers thereof with monovinyl aromatic monomers having from eight to about 20 carbon atoms, olefinic nitrile monomers having the structure

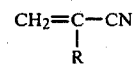

wherein R is hydrogen, a lower alkyl group having from 1 to 4 carbon atoms or a halogen;
esters of olefinically unsaturated carboxylic acids having the structure

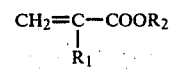

wherein $R_1$ is hydrogen, an alkyl group having from 1 to 30 carbon atoms, or a halogen, and $R_2$ is an alkyl group having from 1 to 6 carbon atoms;
and ethylene-propylene-diene rubber.

18. The process of claim 17, wherein the ethylenically unsaturated monomer is further selected from the group consisting of
esters of olefinically unsaturated carboxylic acids having the structure

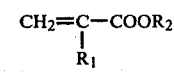

wherein $R_1$ is hydrogen, an alkyl group having from 1 to 30 carbon atoms, or a halogen, and $R_2$ is an alkyl group having from 1 to 6 carbon atoms;
alpha-olefins having the structure

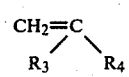

wherein $R_3$ and $R_4$ are alkyl groups having from 1 to 7 carbon atoms; monovinyl aromatic compounds having from eight to about 20 carbon atoms;
vinyl acetate, vinyl propionate, the vinyl butyrates, methyl vinyl ether, ethyl vinyl ether, propyl vinyl ethers, and butyl vinyl ethers, methyl isopropenyl ether, ethyl isopropenyl ether and
mixtures thereof.

19. The process of claim 18 wherein said feed solution comprises:
butadiene/acrylonitrile rubber as said rubbery polymer;
acrylonitrile as said olefinically unsaturated nitrile; and
methylacrylate as said ester.

20. The process of claim 19, wherein the composition of said feed solution comprises from about 10 to 20 weight percent rubbery polymer and the resin produced has a Notched Izod value of greater than 0.5 ft lbs/in.

21. The process of claim 18, wherein said feed solution comprises:
butadiene rubber as said rubbery polymer;

acrylonitrile as said olefinically unsaturated nitrile; and styrene as said monovinyl aromatic compound.

22. The process of claim 21, wherein the composition of said feed solution comprises from about 10 to 20 weight percent rubbery polymer and the resin produced has a Notched Izod value of greater than 1.0 ft lbs/in.

23. The process of claim 16, wherein said step of heating said feed solution is conducted in said feed section at a temperature of from about 50° C. to 100° C. and under a pressure of from about 100 to 500 psi.

24. The process of claim 16, wherein said shearing and reacting steps are conducted at a temperature of from 50° C. to 200° C. and under a pressure of from about 100 to 500 psi.

25. The process of claim 16, wherein said shearing step imparts a Shear Rate of from about 50 to 300 sec$^{-1}$.

26. The process of claim 16, wherein the time for said shearing and reacting steps ranges from about five to about 30 minutes.

27. The process of claim 16, wherein said reactor extruder has twin, co-rotating screws.

* * * * *